(12) United States Patent
Chao et al.

(10) Patent No.: US 8,379,291 B2
(45) Date of Patent: Feb. 19, 2013

(54) RESONATOR SYSTEM

(75) Inventors: Shiuh Chao, Hsinchu (TW);
Chih-T'sung Shih, Hsinchu (TW);
Zhi-Wei Zeng, Hsinchu (TW)

(73) Assignee: National Tsing Hua University,
Hsinchu (TW)

( * ) Notice: Subject to any disclaimer, the term of this patent is extended or adjusted under 35 U.S.C. 154(b) by 382 days.

(21) Appl. No.: 12/651,883

(22) Filed: Jan. 4, 2010

(65) Prior Publication Data

US 2011/0063710 A1 Mar. 17, 2011

(30) Foreign Application Priority Data

Sep. 15, 2009 (TW) ................................ 98131135 A (51) Int. Cl.
*G02F 1/01* (2006.01)
*G02F 1/035* (2006.01)
*G02B 26/00* (2006.01)

(52) U.S. Cl. ............................. 359/276; 359/237; 385/2

(58) Field of Classification Search .......... 359/237–239, 359/245–249, 263, 276, 278, 279, 315, 318, 359/320; 385/1–3, 14, 31, 88, 89, 122, 129, 385/130, 131, 132
See application file for complete search history.

(56) References Cited

U.S. PATENT DOCUMENTS

| | | | | |
|---|---|---|---|---|
| 5,915,051 A | * | 6/1999 | Damask et al. | 385/16 |
| 6,943,931 B1 | * | 9/2005 | Dingel | 359/279 |
| 2006/0193557 A1 | * | 8/2006 | Bradley et al. | 385/32 |
| 2008/0240646 A1 | * | 10/2008 | Yamazaki | 385/14 |
| 2010/0002979 A1 | * | 1/2010 | Diest et al. | 385/8 |
| 2010/0104277 A1 | * | 4/2010 | Robinson et al. | 398/25 |

* cited by examiner

*Primary Examiner* — Dawayne A Pinkney
(74) *Attorney, Agent, or Firm* — WPAT, P.C.; Anthony King (57) ABSTRACT

The designed resonator system comprises a light source generating device for outputting a light source and a resonating cavity device. The resonating cavity device includes: a first waveguide with an input end for receiving the light source; a first resonator disposed adjacent to the first waveguide for receiving the light source coupled from the first waveguide in order to generate a resonating light source; a second waveguide having one end disposed adjacent to the first resonator, an adapting end for receiving the resonating light source coupled from the first resonator, and an output end; and an electro-optic modulator disposed adjacent to the other end of the second waveguide for receiving the resonating light source coupled from the second waveguide and generating an optical modulating signal by an electrical modulating signal, and the optical modulating signal is outputted from the output end of the second waveguide.

22 Claims, 11 Drawing Sheets

RESONATOR SYSTEM

BACKGROUND OF THE INVENTION

1. Field of the Invention

The present invention relates to a resonating cavity, and more particularly, to a resonator system that is independent of temperature variation.

2. Background of the Invention

In the past few years, planar lightwave circuit (PLC) technologies have been widely used in several devices, such as optical filters, optical modulators and optical sensors, and so on. As the PLC technologies have been rapidly developed, the corresponding passive and active devices have also been rapidly developed. For example, as the requirements of communication capacity get higher and higher in DWDM (dense wavelength division multiplexing) system and signal wavelengths need to be set near the minimum transmission lost point of optical fibers as far as possible, the distances of each signal wavelength get narrower and narrower. Thus, it is one of the very important topics in developing semiconductor optical devices on silicon substrate for frequency selectivity. Ring filters keep the signals selectivity and are widely used in wavelength filtering applications for its characteristic of high Q value. Therefore, ring filters are important devices in optical signals processing.

Figure 1:
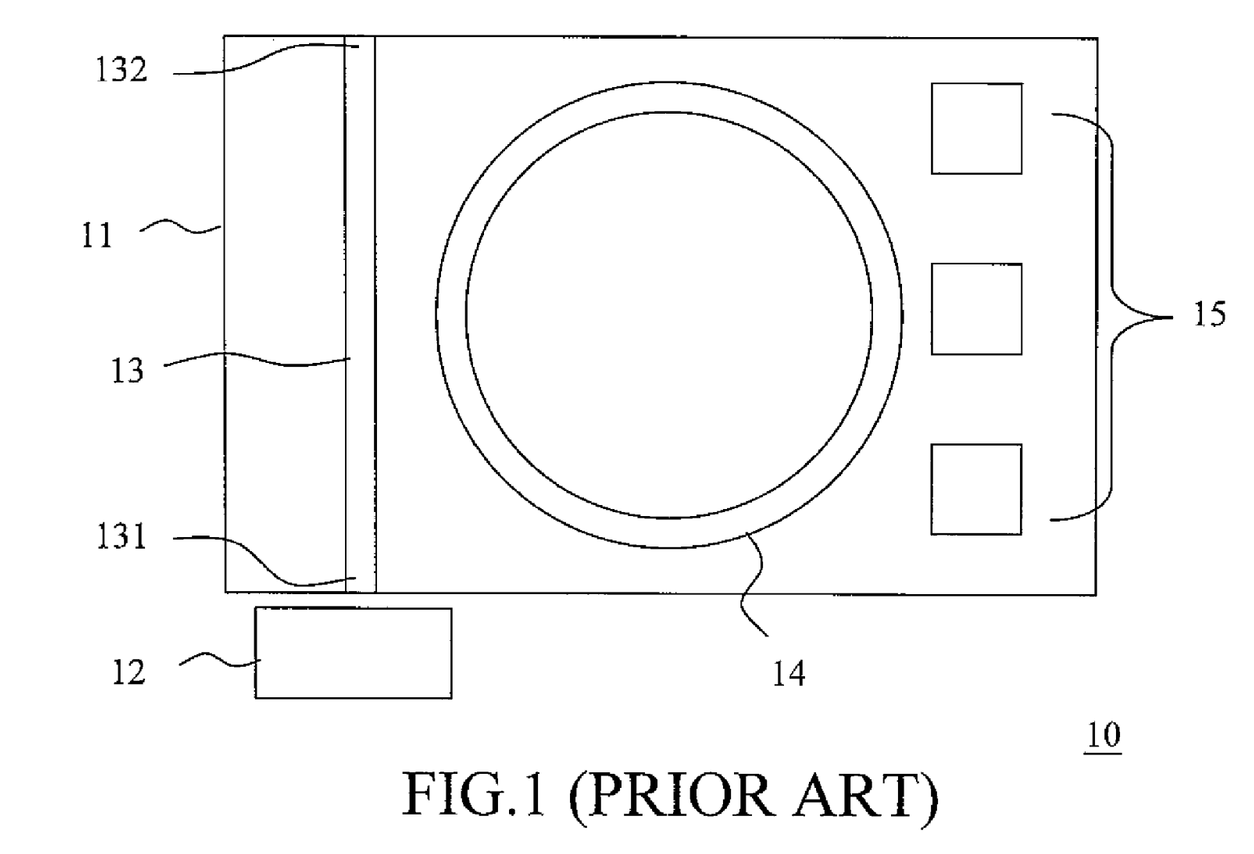
FIG. 1 shows a perspective drawing of a traditional resonator system.

FIG. 1 is a perspective drawing of a traditional resonator system. The resonator system 10 is consisted of a resonating cavity device 11 and a light source 12. The resonating cavity device 11 comprises a waveguide 13, a ring resonator (electro-optic modulator) 14 and a modulating control unit 15. The light source 12 provides an optical wave (an optical signal) with a particular wavelength entering the resonating cavity device 11 from the input end 131 of the waveguide 13 and outputting from the output end 132 of the waveguide 13. The operation principle of the ring resonator (electro-optic modulator) 14 is similar to the Fabry-Perot resonator. However, the ring resonator 14 can achieve the function of self-feedback without a reflection surface. Assuming the ring resonator (electro-optic modulator) 14 has a circumference of L and a power attenuation constant of $\alpha$, it generates an attenuation volume of $e^{-\alpha L}$ and a phase conversion after the optical wave being coupled to the ring resonator (electro-optic modulator) 14 and going around and back to the original coupling point in the ring resonator (electro-optic modulator) 14. The phase conversion is associated with the circumference of L and the wavelength of the inputting optical wave of the ring resonator (electro-optic modulator) 14. By the principle, parts energy of the optical wave will be transferred to the ring resonator (electro-optic modulator) 14 after the optical wave entering the resonating cavity device 11 from the input end 131 of the waveguide 13. The optical wave is continuously resonating back and forth in the ring resonator (electro-optic modulator) 14 and coupling back to the waveguide 13 and outputting from the output end 132 of the waveguide 13. Therefore, the high Q value will be achieved. OFF-state of the modulating control unit 15 is used for the ring resonator (electro-optic modulator) 14 operating in a normal mode. After receiving a voltage signal or a current signal, the ON-state modulating control unit 15 fine-tunes the peak value of the output signal of the output end 132.

Generally speaking, the ring resonator (electro-optic modulator) 14 is sensitive to the operating wavelength of the optical wave and the variation of ambient temperature. Accordingly, when the ambient temperature changes, the electro-optic characteristic of the ring resonator (electro-optic modulator) 14 will be changed extremely.

Figure 2:
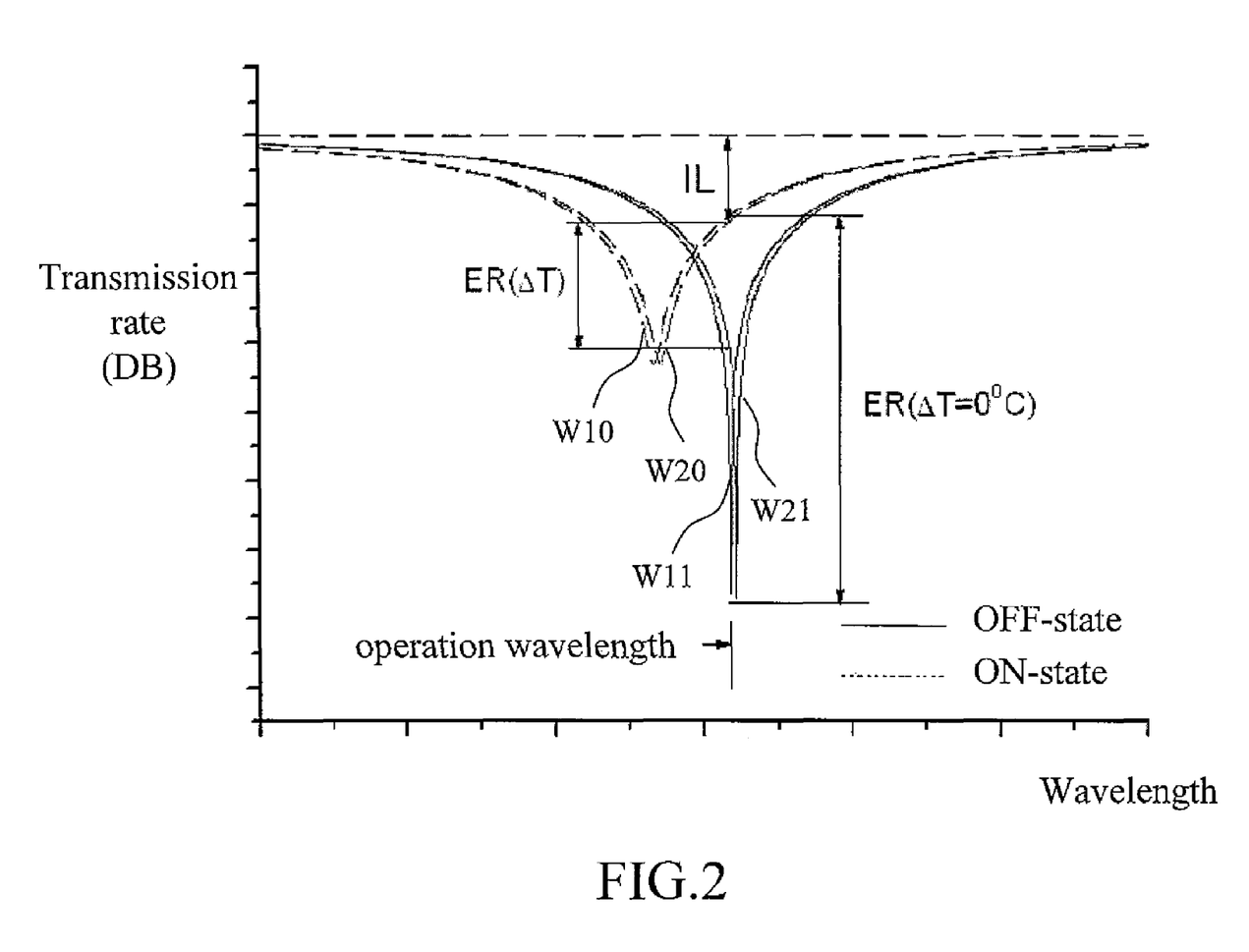
FIG. 2 shows a transmission spectrum drawing of the traditional resonator system shown in FIG. 1.

FIG. 2 is an output spectrum drawing of the traditional resonator system shown in FIG. 1. W10 and W11 are output spectrums of the modulating control unit 15 switching between ON-state and OFF-state in a certain ambient temperature condition, respectively; W20 and W21 are output spectrums of the modulating control unit 15 switching between ON-state and OFF-state in a varying ambient temperature condition, respectively. IL is the insertion loss of the ring resonator 14, and ER is the extinction ratio of the ring resonator 14. From FIG. 2, it is easy to realize that the insertion loss of the ring resonator 14 is less affected by the temperature variation when the operation wavelength is a light source with single wavelength (the range of wavelength ±0.1 nm being a single wavelength). Nevertheless, the extinction ratio of the ring resonator 14 is much affected by the temperature variation. As the temperature changes, the operating wavelength will follow the temperature variation, the insertion loss and extinction ratio will be deteriorated. For overcoming the problems above, ordinarily, it adds a temperature controller (not shown) in the resonating cavity device 11 for keeping the temperature inside the resonating cavity device 11 or decreasing the amount of temperature variation inside the resonating cavity device 11. Thus, the operation wavelength will be almost kept in a constant, so as to decrease the insertion loss and extinction ratio deterioration of the ring resonator 14.

Although the insertion loss and extinction ratio deterioration may be improved by adding the temperature controller such as the TEC (thermoelectric controller), but the manufacture cost, power consumption and device sizes are not benefit for use by using such active control method.

It is desirable, therefore, to provide a resonator system that is independent of temperature variation without adding too much manufacture cost, power consumption and device sizes.

SUMMARY OF THE INVENTION

The above-mentioned problems are addressed by the present invention. The method of the present invention will be understood according to the disclosure of the following specification and drawings.

The resonator system of the present invention comprises a light source generating device for outputting a light source; and a resonating cavity device including: a first waveguide with an input end for receiving the light source; a first resonator disposed adjacent to the first waveguide for receiving the light source coupled from the first waveguide in order to generate a resonating light source; a second waveguide having one end disposed adjacent to the first resonator, an adapting end for receiving the resonating light source coupled from the first resonator, and an output end; and an electro-optic modulator disposed adjacent the second waveguide for receiving the resonating light source coupled from the second waveguide and generating an optical modulating signal by an electrical modulating signal, and the optical modulating signal is outputted from the output end of the second waveguide.

Another embodiment of the present invention is to provide a resonator system which comprises a light source generating device for outputting a light source; and a resonating cavity device including: a first waveguide with an input end for receiving the light source; a first resonator disposed adjacent to the first waveguide for receiving the light source coupled from the first waveguide in order to generate a resonating light source; a second waveguide having one end disposed adjacent to the first resonator and an adapting end for receiving the resonating light source coupled from the first resonator; an electro-optic modulator disposed adjacent to the second waveguide for receiving the resonating light source coupled from the second waveguide and generating an optical modulating signal by an electrical modulating signal; and a third waveguide having one end disposed adjacent to the electro-optic modulator, an adapting end for receiving the electrical modulating signal coupled from the electro-optic modulator, and an output end for outputting the electrical modulating signal.

BRIEF DESCRIPTION OF THE DRAWINGS

The invention will be described according to the appended drawings in which.

DETAILED DESCRIPTION OF THE INVENTION

Unlike adding the temperature controller of the traditional resonator system, the resonator system of the present invention disposes a resonator and a waveguide for outputting. The resonator follows the varying temperature to change the electro-optic characteristic for compensating the influence of the temperature variation. The present invention needs not to detect temperature actively to keep a certain temperature. The present invention uses a passive compensation way to lower the manufacture cost, power consumption and device sizes. Moreover, the inputted light source of the present invention can be a broadband light source with a plurality of wavelengths for using in various applications due to the resonator system of the present invention compensating the influence of the temperature variation.

Figure 3:
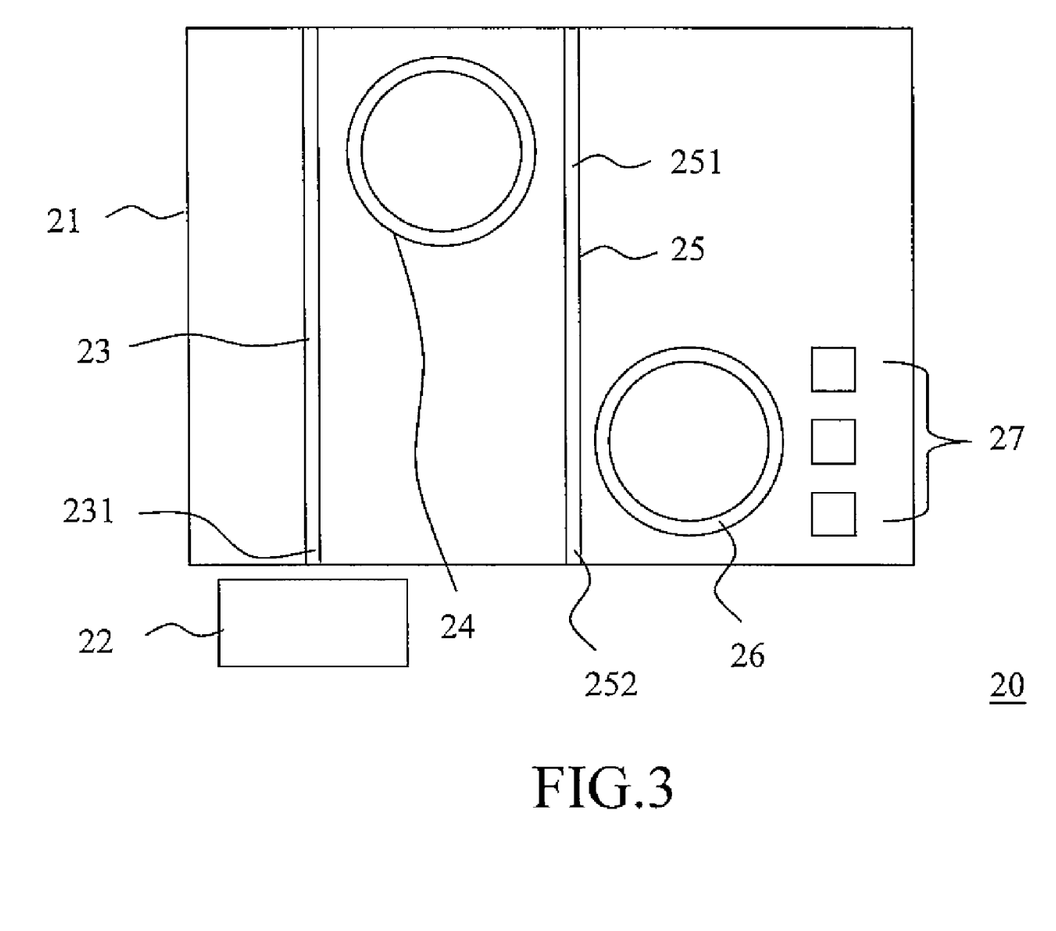
FIG. 3 shows a perspective drawing of a resonator system of the present invention.

FIG. 3 is a perspective drawing of the resonator system of the present invention. The resonator system 20 comprises a resonation cavity device 21 and a light source generating device 22 for outputting a light source. Light source outputting from the light source generating device 22 is coupled and processed through the resonation cavity device 21. The applications of the coupled and processed light source will be no longer described because the applications of the coupled and processed light source are not the key point in the present invention.

The resonating cavity device 21 of the present invention includes a first waveguide 23, a first resonator 24, a second waveguide 25, an electro-optic modulator 26 and a modulating control unit 27. The first waveguide 23 has an input end 231 for receiving the light source generated from the light source generating device 22. The light source outputted from the light source generating device 22, therefore, enters the resonating cavity device 21 through the input end 231 of the first waveguide 23. The first resonator 24 is disposed adjacent to the first waveguide 23 for receiving the light source coupled from the first waveguide 23 in order to generate a resonating light source. The second waveguide 25 has one end disposed adjacent to the first resonator 24, an adapting end 251 for receiving the resonating light source coupled from the first resonator 24, and an output end 252. The electro-optic modulator 26 is disposed adjacent to the other end of the second waveguide 25 for receiving the resonating light source coupled from the second waveguide 25 and generating an optical modulating signal by an electrical modulating signal. The optical modulating signal outputs from the output end 252 of the second waveguide 25. The optical modulating signal converted from the input light source through the resonating cavity device 21 can be used in various applications of optical signals processing. After receiving a voltage signal or a current signal, the modulating control unit 27 changes to ON-state for tuning the optical power of the resonating light source in the second waveguide 25.

The first resonator 24 is a temperature compensating element for compensating wavelength variation of the light source when the ambient temperature varies. The shape of the first resonator 24 could be ring-type or racetrack-type. The racetrack-type refers to an ellipse track of horse racing. The electro-optic modulator 26 is a function element, as a ring-resonator (shown in figures), a filter, a sensor, a filter module or other electro-optic characteristic adjustable elements, for changing the electro-optic characteristic of the resonating light source. The shape of the electro-optic modulator 26 could be ring-type or racetrack-type, too.

In the following embodiments, the definitions of resonator and electro-optic modulator are the same to aforementioned. The radius of curvature of which is 1~1000 um and the shape of which could be ring-type or racetrack-type.

Because of the present invention coupling and overlapping the light source, the distances between the elements in the resonating cavity device 21 should not be too far for avoiding the light source attenuating too much. Thus, for example, the distance between the first waveguide 23 and the first resonator 24 is about 10~1000 nm; the distance between the first resonator 24 and the second waveguide 25 is about 10~1000 nm; and the distance between the second waveguide 25 and the electro-optic modulator 26 is about 10~1000 nm.

Figure 4:
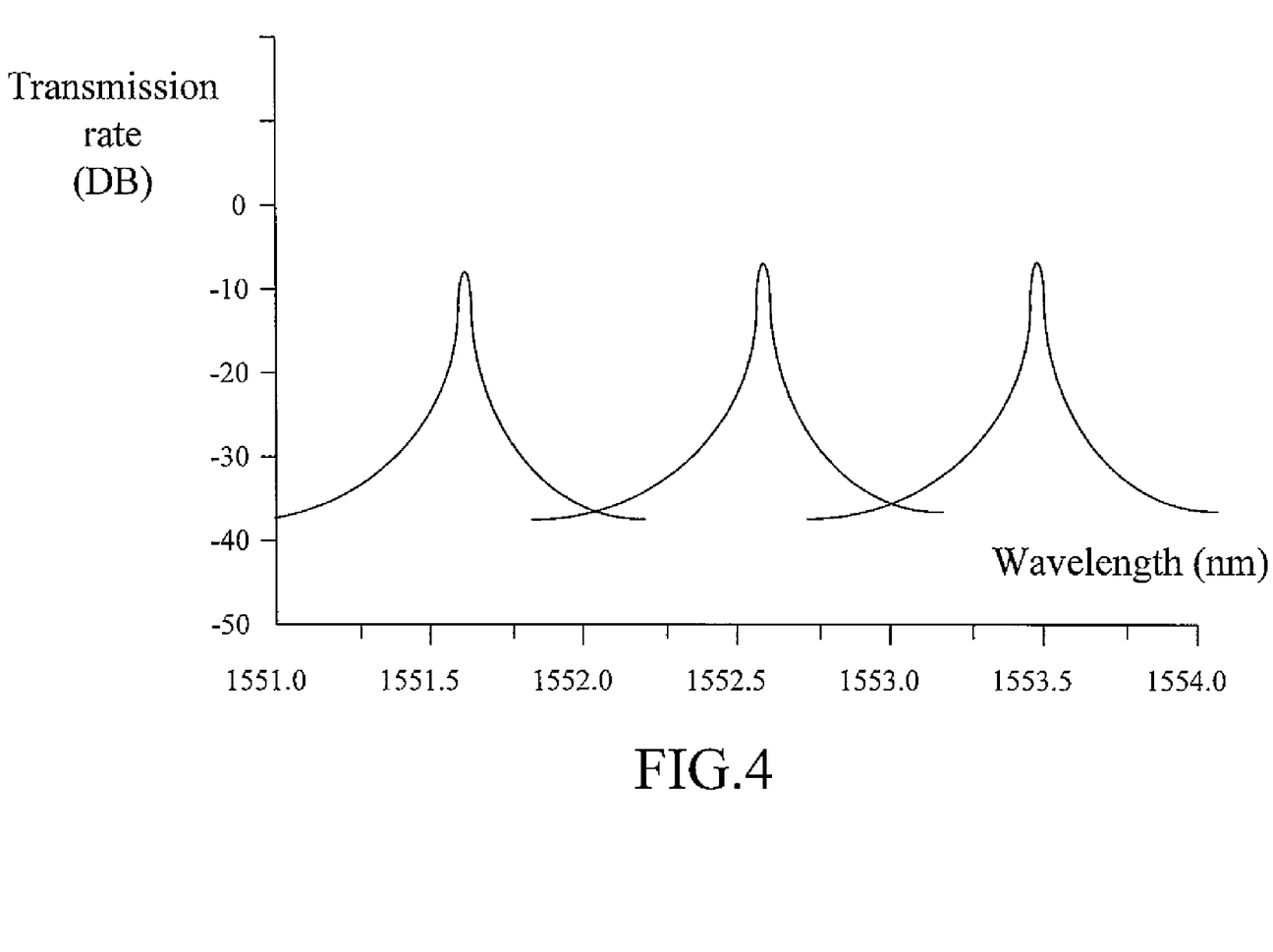
FIG. 4 shows a transmission spectrum drawing of the resonating light source of the present invention.

The first resonator 24 and the electro-optic modulator 26 of the present invention are two identical resonators. The circumference and attenuation coefficient of which are both the same. The first resonator 24 is used as a filter and the electro-optic modulator 26 is used as a resonator. When ambient temperature varies, light source wavelength outputted from the light source generating device 22 will be changed, and the operation wavelength and the resonating light source wavelength of the first resonator 24 will be also changed. However, the operation wavelength of the electro-optic modulator 26 is changed according to the varying ambient temperature. The variation amount of the operation wavelength of the electro-optic modulator 26 is the same as the variation amount of the operation wavelength of the first resonator 24. The resonating light source is coupled to the second waveguide 25 and then coupled to the electro-optic modulator 26 for modulating. The electro-optic modulator 26 modulates the resonating light source by the electrical modulating signal for generating the optical modulating signal. The optical modulating signal is then outputted from the output end 252 of the second waveguide 25. The transmission spectrum of the resonating light source coupled from the first resonator 24 to the second waveguide 25 is shown in FIG. 4. As ambient temperature varies, the wavelength of the light source will be changed and the wavelength of the resonating light source will be also changed.

Figure 5:
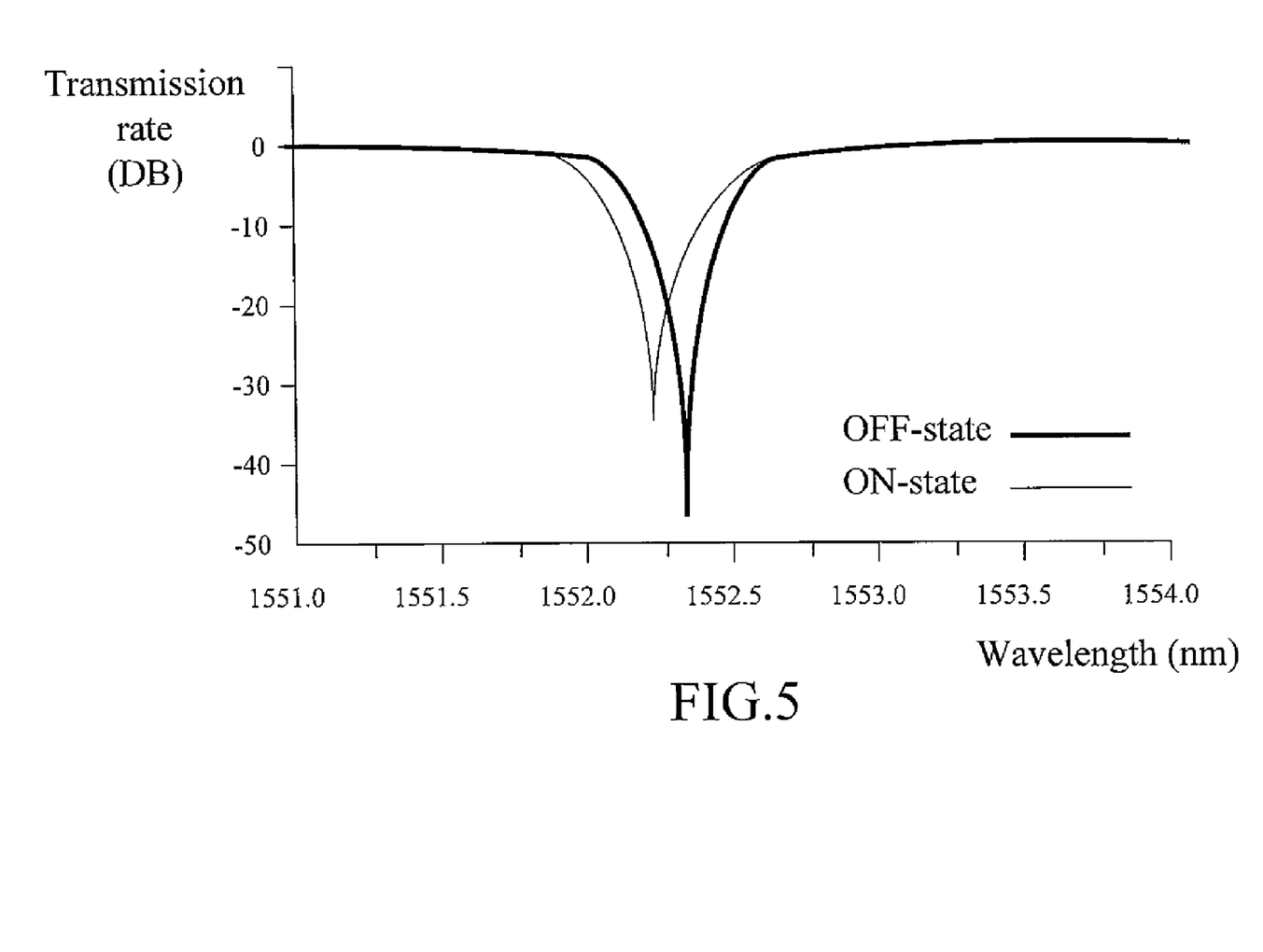
FIG. 5 shows a transmission spectrum drawing of the modulating control unit of the present invention.

FIG. 5 is a transmission spectrum drawing of the modulating control unit 27 of the present invention. OFF-state of the modulating control unit 27 is used for the electro-optic modulator 26 operating in a normal mode. After receiving a voltage signal or a current signal, the ON-state modulating control unit 27 tunes the resonating light source in the second waveguide 25.

Figure 6:
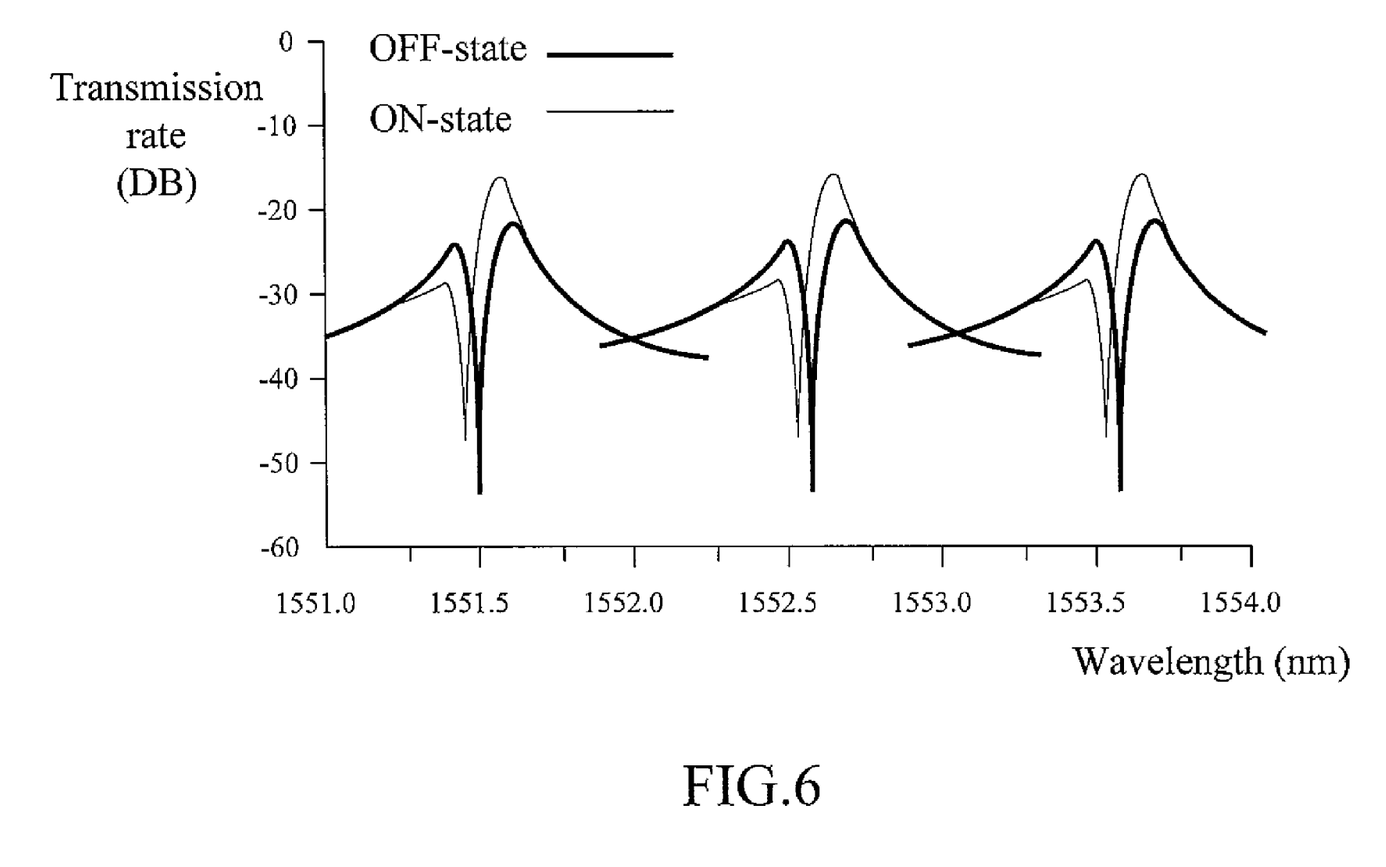
FIG. 6 shows a transmission spectrum drawing of the optical modulating signal of the present invention.

FIG. 6 is a transmission spectrum drawing of the optical modulating signal of the present invention. The transmission spectrum is overlapped by the resonating light source shown in FIG. 4 and the electrical modulating signal shown in FIG. 5. As the first resonator 24 and the electro-optic modulator 26 are two identical resonators, which will compensate the light source and the resonating light source for their wavelengths variation by temperature. The optical modulating signal is not affected by the ambient temperature variation and the inputted light source wavelength variation for keeping the original electro-optic characteristic. It compensates the changed electro-optic characteristic followed the ambient temperature variation for keeping high extinction ratio.

The insertion loss of the present invention increases due to the adding resonator and waveguide. However, the insertion loss is finite and will not affect the original electro-optic characteristic. Meanwhile, the FWHM (full-width at half-maximum) value of ON-state and OFF-state coupling spectrum of the modulating control unit 27 is getting smaller. Thus, the extinction ratio of the present invention is larger than the resonator system with only one resonator.

Figure 7:
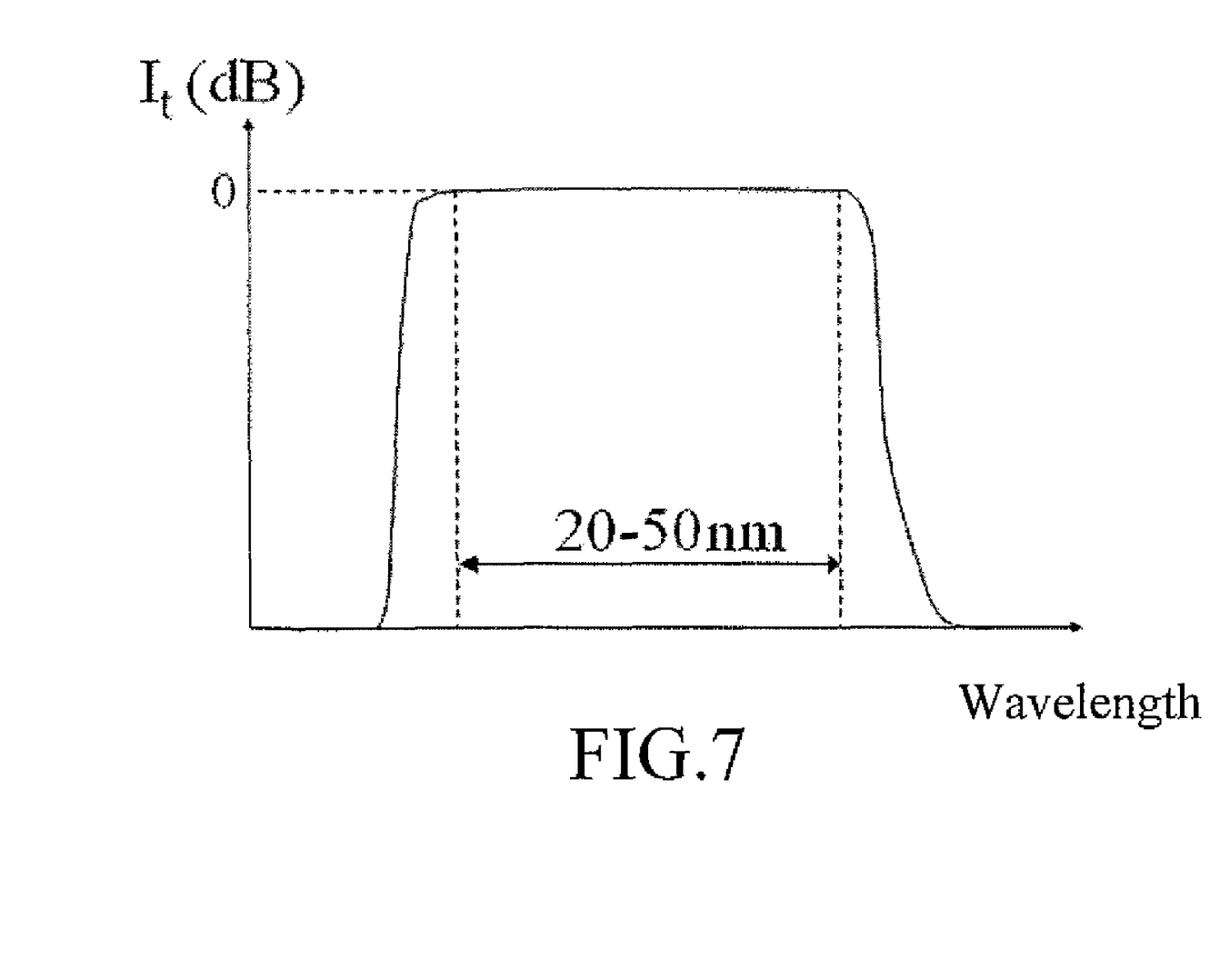
FIG. 7 shows a spectrum drawing of the light source of the present invention.

FIG. 7 is a spectrum drawing of the light source of the present invention. Generally speaking, the light source is a broadband light source with a wavelength between 20 nm to 50 nm. The affect ratio of ambient temperature variation to the light source is smaller because of the larger bandwidth. Assuming the operation wavelength of the first resonator 24 is not appropriately around 20 nm or 50 nm (bandwidth edge), the first resonator 24 could generate the needed operation wavelength or resonating wavelength of the electro-optic modulator 26 for resonating and coupling.

Figure 8:
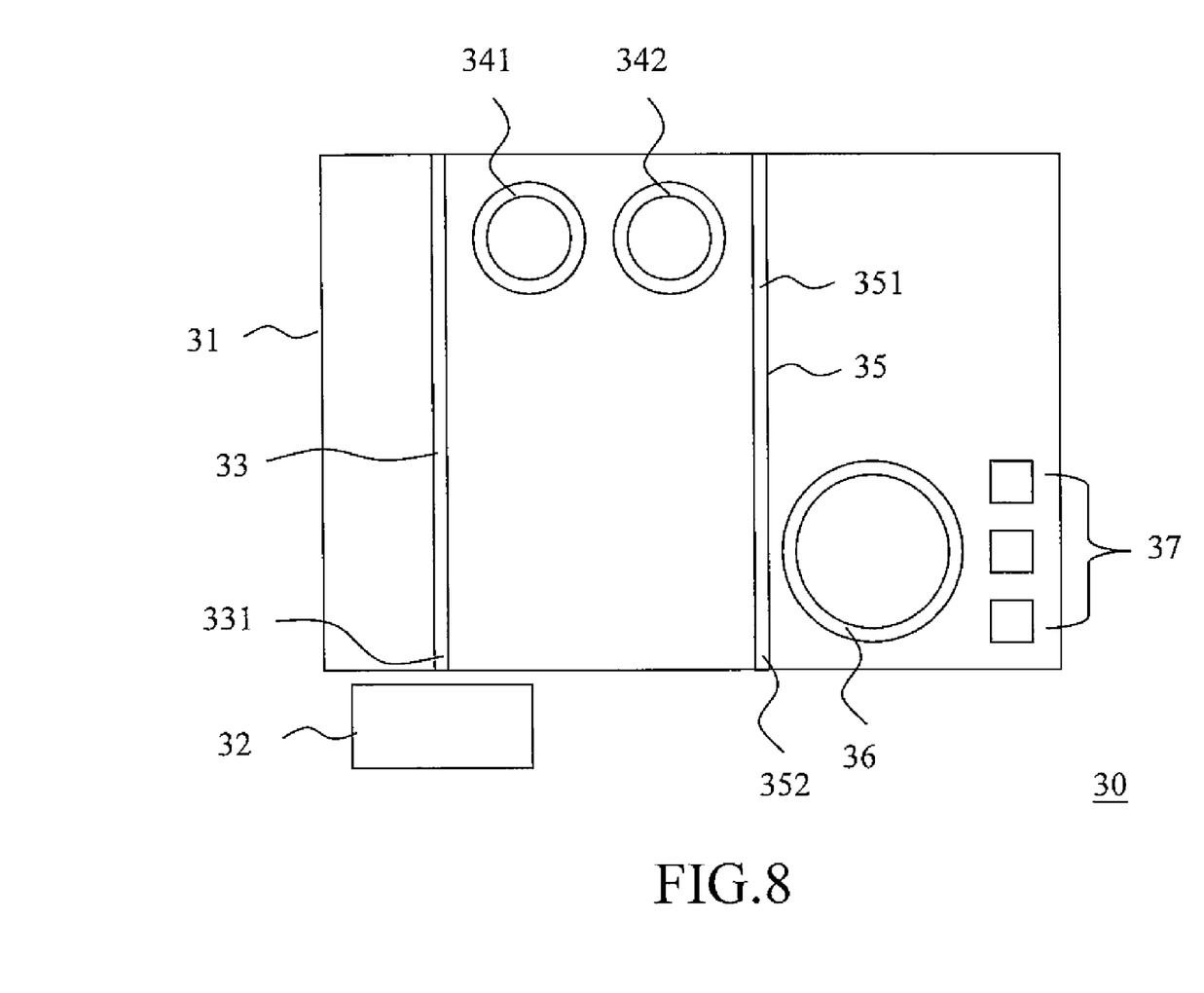
FIG. 8 shows another embodiment of the resonator system of the present invention.

FIG. 8 is another embodiment of the resonator system of the present invention. The resonator system 30 comprises a resonation cavity device 31 and a light source generating device 32 for outputting a light source. The light source outputting from the light source generating device 32 is coupled and processed through the resonation cavity device 31. The applications of the coupled and processed light source will be no longer described because the applications of the coupled and processed light source are not the key point in the present invention.

The resonating cavity device 31 of the present invention includes a first waveguide 33, a first resonator 341, a second resonator 342, a second waveguide 35, an electro-optic modulator 36 and a modulating control unit 37. The first waveguide 33 has an input end 331 for receiving the light source generated from the light source generating device 32. The light source, therefore, enters the resonating cavity device 31 through the input end 331 of the first waveguide 33. The first resonator 341 is disposed adjacent to the first waveguide 33 for receiving the light source coupled from the first waveguide 33 in order to generate a first resonating light source. The second resonator 342 is disposed adjacent to the first resonator 341 for receiving the first resonating light source coupled from the first resonator 341 in order to generate a second resonating light source. The second waveguide 35 has one end disposed adjacent to the second resonator 342, an adapting end 351 for receiving the second resonating light source coupled from the second resonator 342, and an output end 352. The electro-optic modulator 36 is disposed adjacent to the other end of the second waveguide 35 for receiving the second resonating light source coupled from the second waveguide 35 and generating an optical modulating signal by an electrical modulating signal, and the optical modulating signal is outputted from the output end of the second waveguide. The optical modulating signal converted from the input light source through the resonating cavity device 31 can be used in various applications of optical signals processing. After receiving a voltage signal or a current signal, the modulating control unit 37 changes to ON-state for tuning the optical power of the second resonating light source in the second waveguide 35.

Comparing with the resonator system 20 in FIG. 3, the second resonator 342 (or a plurality of resonators) is added in the resonator system 30. Therefore, the transmission spectrum of the resonating light source of FIG. 3 is narrower and sharper than FIG. 4 and the peak-to-valley value of the optical modulation signal of FIG. 3 is higher than FIG. 6 for decreasing the deterioration of system insertion loss and extinction ratio.

Moreover, there are N sets, of a waveguide and a resonator disposed in sequence between the second resonator 342 and the second waveguide 35. N is an integer larger than 1.

Because of the present invention coupling and overlapping the light source, the distances between the elements in the resonating cavity device 31 should not be too far for avoiding the light source attenuating too much. Thus, for example, the distance between the first waveguide 33 and the first resonator 341 is about 10~1000 nm; the distance between the first resonator 341 and the second resonator 342 is about 10~1000 nm; the distance between the second resonator 342 and the second waveguide 35 is about 10~1000 nm; and the distance between the second waveguide 35 and the electro-optic modulator 36 is about 10~1000 nm.

Figure 9:
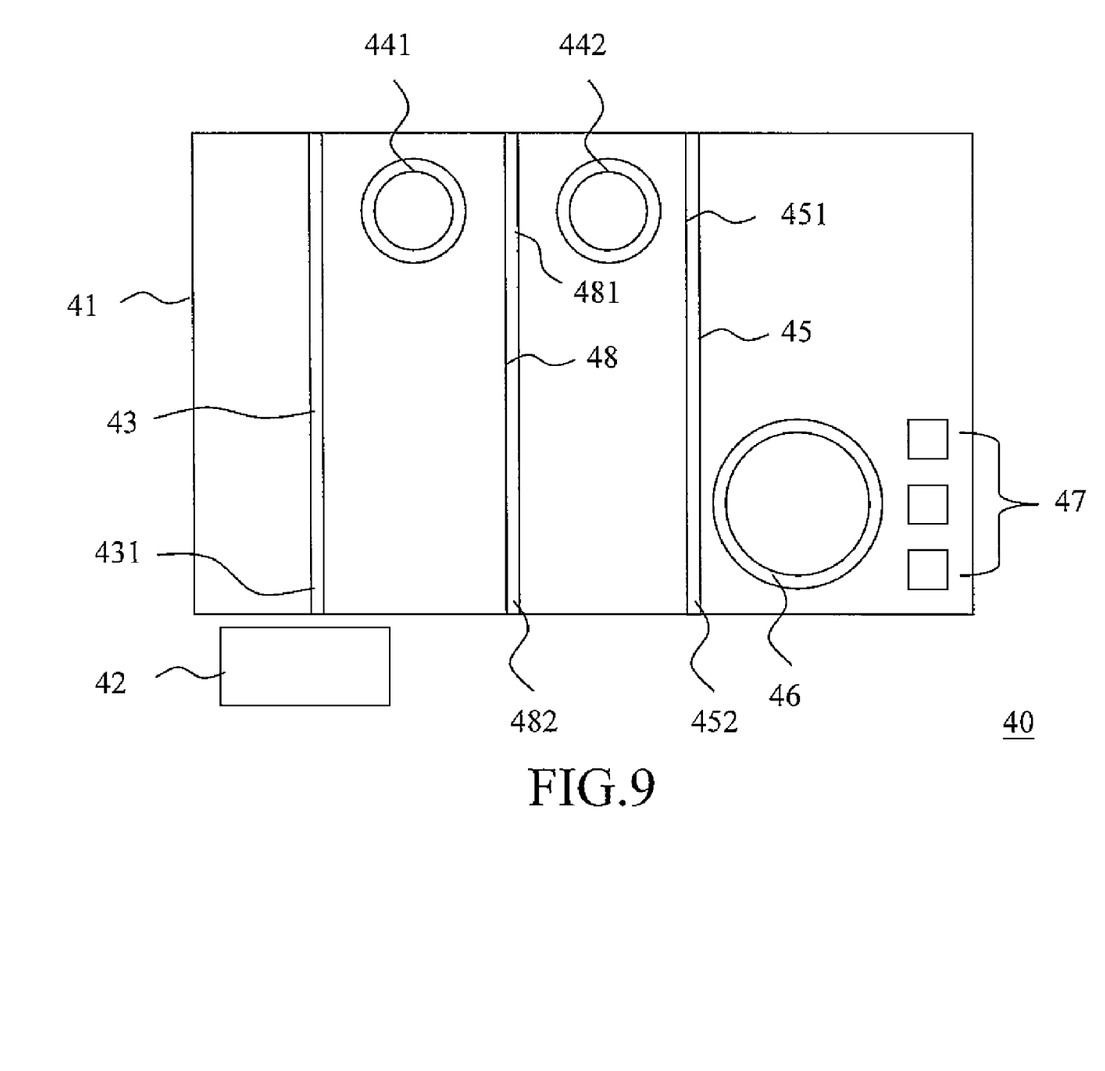
FIG. 9 shows another embodiment of the resonator system of the present invention.

FIG. 9 is another embodiment of the resonator system of the present invention. The resonator system 40 comprises a resonation cavity device 41 and a light source generating device 42 for outputting a light source. The light source outputting from the light source generating device 42 is coupled and processed through the resonation cavity device 41. The applications of the coupled and processed light source will be no longer described because the applications of the coupled and processed light source are not the key point in the present invention.

The resonating cavity device 41 of the present invention includes a first waveguide 43, a first resonator 441, a second resonator 442, a second waveguide 48, a third waveguide 45, an electro-optic modulator 46 and a modulating control unit 47. The difference between the resonator system 40 and the resonator system 30 shown in FIG. 8 is that there is an extra waveguide disposed between the first resonator and the second resonator. The first waveguide 43 has an input end 431 for receiving the light source generated from the light source generating device 42. The light source, therefore, enters the resonating cavity device 41 through the input end 431 of the first waveguide 43. The first resonator 441 is disposed between the first waveguide 43 and the second waveguide 48 for receiving the light source coupled from the first waveguide 43 in order to generate a first resonating light source. The second waveguide 48 has one end disposed adjacent to the first resonator 441, an adapting end 481 for receiving the first resonating light source coupled from the first resonator 441, and an output end 482. The second resonator 442 is disposed adjacent to the second waveguide 48 for receiving the first resonating light source coupled from the second waveguide 48 in order to generate a second resonating light source. The third waveguide 45 has one end disposed adjacent to the second resonator 442, an adapting end 451 for receiving the second resonating light source coupled from the second resonator 442, and an output end 452. The to electro-optic modulator 46 is disposed adjacent to the other end of the third waveguide 45 for receiving the second resonating light source coupled from the third waveguide 45 and generating an optical modulating signal by an electrical modulating signal. The optical modulating signal converted from the input light source through the resonating cavity device 41 can be used in various applications of optical signals processing. After receiving a voltage signal or a current signal, the modulating control unit 47 changes to ON-state for tuning the optical power of the second resonating light source in the third waveguide 45.

Comparing with the resonator system 30 in FIG. 8, the second waveguide 48 (or a combination of N resonators and N waveguides) is added in the resonator system 30. Therefore, the transmission spectrum of the resonating light source is narrower and sharper than the FIG. 4's and the peak-to-valley value of the optical modulation signal is higher than the FIG. 6's for decreasing the deterioration of system insertion loss and extinction ratio.

Because of the present invention coupling and overlapping the light source, the distances between the elements in the resonating cavity device 41 should not be too far for avoiding the light source attenuating too much. Thus, for example, the distance between the first waveguide 43 and the first resonator 441 is about 10~1000 nm; the distance between the first resonator 441 and the second waveguide 48 is about 10~1000 nm; the distance between the second waveguide 48 and the second resonator 442 is about 10~1000 nm; the distance between the second resonator 442 and the third waveguide 45 is about 10~1000 nm; and the distance between the third waveguide 45 and the electro-optic modulator 46 is about 10~1000 nm.

Figure 10:
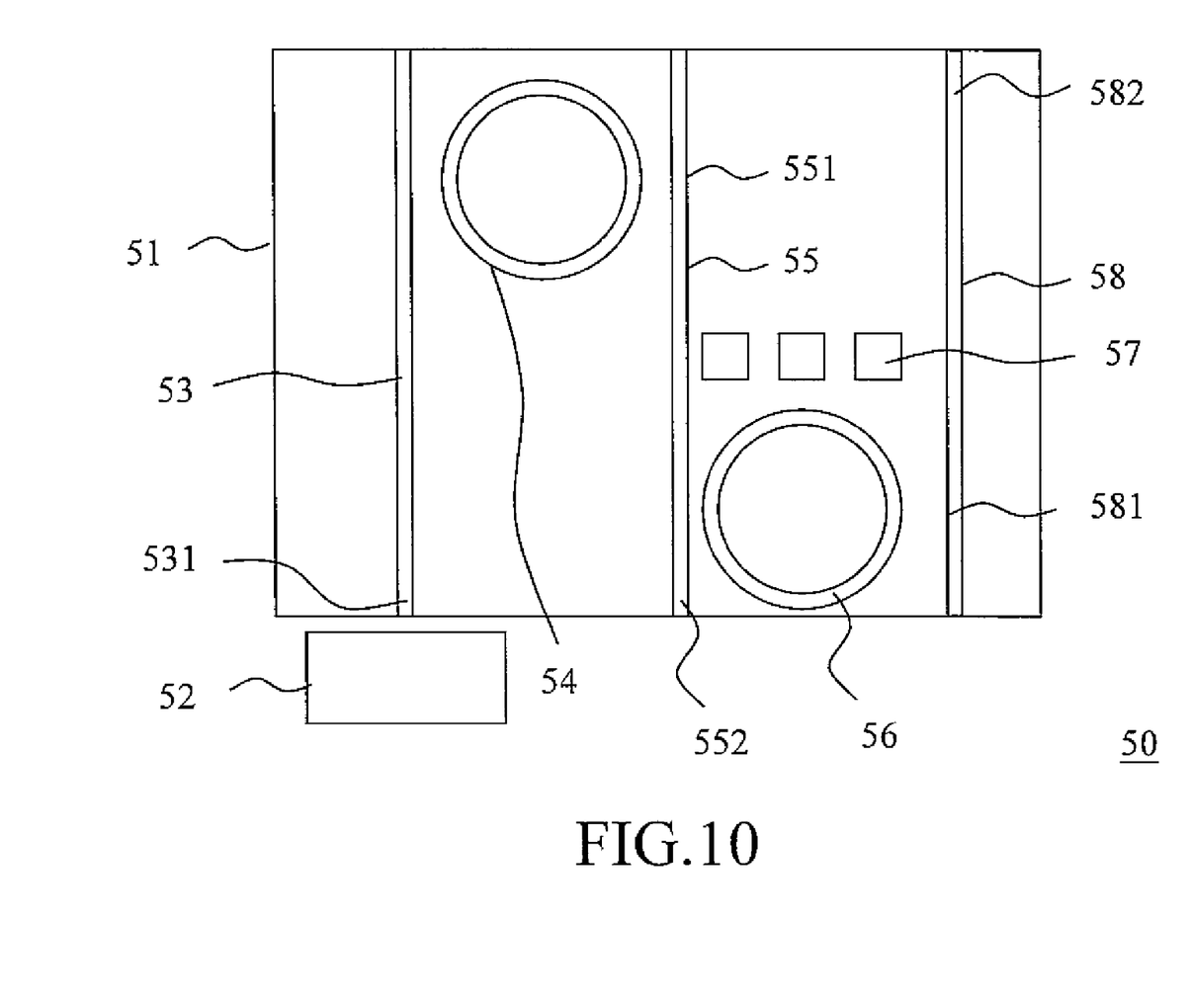
FIG. 10 shows another embodiment of the resonator system of the present invention.

FIG. 10 is a further embodiment of the resonator system of the present invention. The resonator system 50 comprises a resonation cavity device 51 and a light source generating device 52 for outputting a light source. The resonator system 50 is similar to the resonator system 20 shown in FIG. 3. The difference between the two resonator systems is that there is an extra waveguide disposed in the right of the second resonator.

The resonating cavity device 51 of the present invention includes a first waveguide 53, a first resonator 54, a second waveguide 55, an electro-optic modulator 56, a modulating control unit 57, and a third waveguide 58. The first waveguide 53 has an input end 531 for receiving the light source generated from the light source generating device 52. The light source, therefore, enters the resonating cavity device 51 through the input end 531 of the first waveguide 53. The first resonator 54 is disposed adjacent to the first waveguide 53 for receiving the light source coupled from the first waveguide 53 in order to generate a first resonating light source. The second waveguide 55 has one end disposed adjacent to the first resonator 54, an adapting end 551 for receiving the first resonating light source coupled from the first resonator 54, and an output end 552. The electro-optic modulator 56 is disposed adjacent to the other end of the second waveguide 55 for receiving the first resonating light source coupled from the second waveguide 55 and generating an optical modulating signal by an electrical modulating signal. The third waveguide 58 has one end disposed adjacent to the electro-optic modulator 56, an adapting end 581 for receiving the optical modulating signal coupled from the electro-optic modulator 56, and an output end 582. The optical modulating signal is then outputted from the output end 582 of the third waveguide 58. The optical modulating signal converted from the input light source through the resonating cavity device 51 can be used in various applications of optical signals processing. After receiving a voltage signal or a current signal, the modulating control unit 57 changes to ON-state for tuning the optical power of the second resonating light source in the second waveguide 55.

Figure 11:
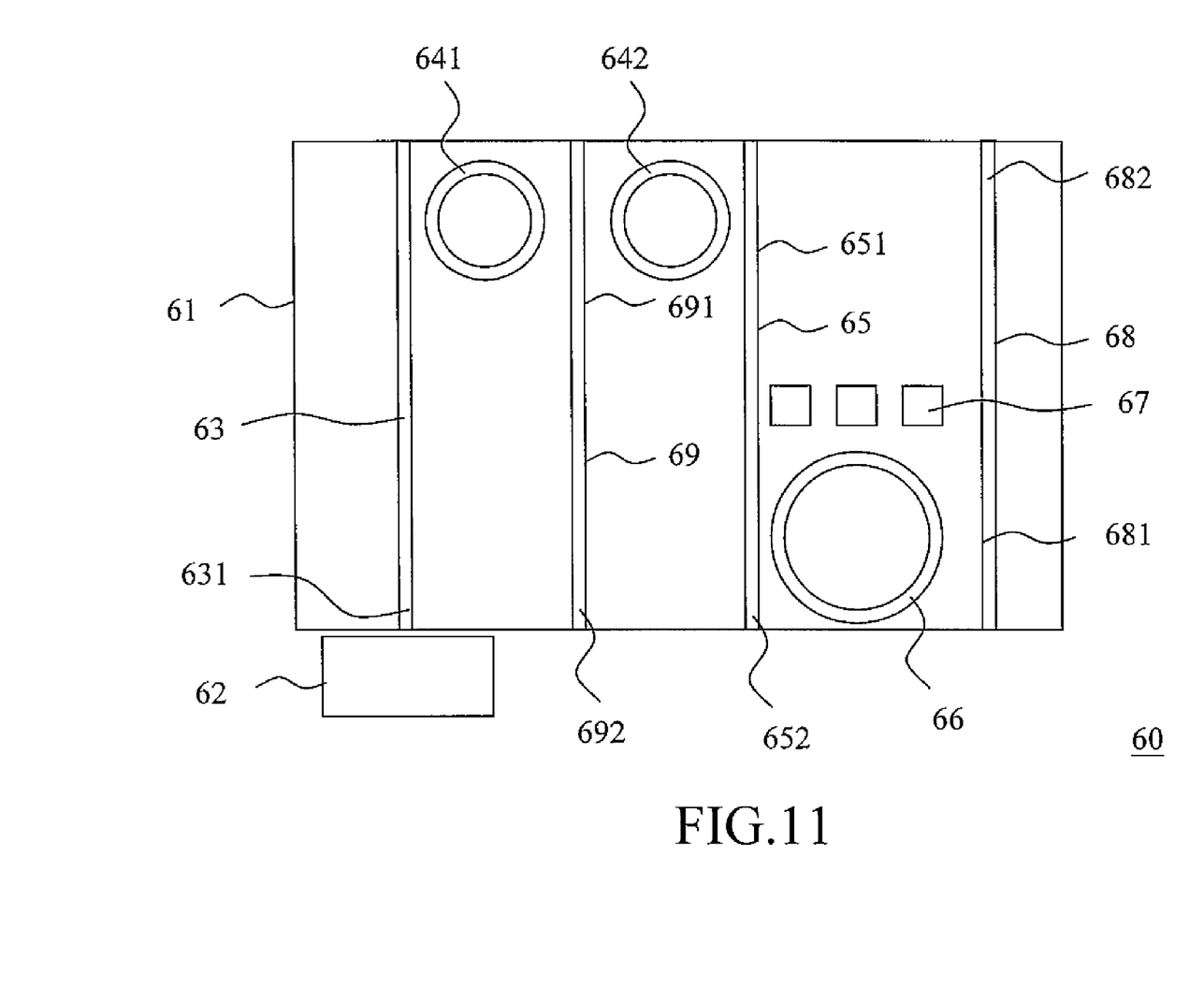
FIG. 11 shows an extending embodiment of the resonator system shown in FIG. 10.

FIG. 11 is an extending embodiment of the resonator system shown in FIG. 10. The resonator system 60 comprises a resonation cavity device 61 and a light source generating device 62 for outputting a light source. The resonator system 60 is similar to the resonator system 50 shown in FIG. 10. The difference between the two resonator systems is that there is an extra set of a waveguide and a resonator disposed between the first resonator and the second waveguide.

The resonating cavity device 61 of the present invention includes a first waveguide 63, a first resonator 6 41, a fourth waveguide 69, a second resonator 642, a second waveguide 65, an electro-optic modulator 66, a modulating control unit 67, and a third waveguide 68. The first waveguide 63 has an input end 631 for receiving the light source generated from the light source generating device 62. The light source, therefore, enters the resonating cavity device 61 through the input end 631 of the first waveguide 63. The first resonator 641 is disposed between the first waveguide 63 and the fourth waveguide 69 for receiving the light source coupled from the first waveguide 63 in order to generate a first resonating light source. The fourth waveguide 69 has one end disposed adjacent to the first resonator 641, an adapting end 691 for receiving the first resonating light source coupled from the first resonator 641, and an output end 692. The second resonator 642 is disposed adjacent to the fourth waveguide 69 for receiving the first resonating light source coupled from the fourth waveguide 69 in order to generate a second resonating light source. The second waveguide 65 has one end disposed adjacent to the second resonator 642, an adapting end 651 for receiving the second resonating light source coupled from the second resonator 642, and an output end 652. The electro-optic modulator 66 is disposed adjacent to the other end of the second waveguide 65 for receiving the second resonating light source coupled from the second waveguide 65 and generating an optical modulating signal by an electrical modulating signal. The third waveguide 68 has one end disposed adjacent to the electro-optic modulator 66, an adapting end 681 for receiving the optical modulating signal coupled from the electro-optic modulator 66, and an output end 682. The optical modulating signal is then outputted from the output end 682 of the third waveguide 68. The optical modulating signal converted from the input light source through the resonating cavity device 61 can be used in various applications of optical signals processing. After receiving a voltage signal or a current signal, the modulating control unit 67 changes to ON-state for tuning the optical power of the second resonating light source in the second waveguide 65.

Moreover, there are N sets of a waveguide and a resonator disposed in sequence between the first resonator 641 and the second waveguide 65. N is an integer larger than 1.

The above-described embodiments of the present invention are intended to be illustrative only. Numerous alternative embodiments may be devised by those skilled in the art without departing from the scope of the following claims.

What is claimed is:

1. A resonator system comprising a light source generating device for outputting a broadband light source and a resonating cavity device;
    wherein the resonating cavity device includes:
    a first waveguide with an input end for receiving the light source;
    a first resonator disposed adjacent to the first waveguide for receiving the light source coupled from the first waveguide and generating a resonating light source;
    a second waveguide having one side disposed adjacent to the first resonator, an adapting end for receiving the resonating light source coupled from the first resonator, and an output end; and
    an electro-optic modulator disposed adjacent to the other side of the second waveguide for receiving the resonating light source coupled from the second waveguide and generating an optical modulating signal by an electro-modulating signal, and the optical modulating signal is outputted from the output end of the second waveguide,
    wherein the shape of the first resonator is ring-shaped or racetrack shaped, and the shape of the electro-optic modulator is ring-shaped or racetrack shaped.

2. The resonator system of claim 1, wherein the electro-optic modulator further comprises a modulating control unit for tuning the resonating light source in the second waveguide.

3. The resonator system of claim 2, wherein the modulating control unit receives a electric signal for tuning the resonating light source in the second waveguide.

4. The resonator system of claim 1, wherein the distances between the first waveguide and the first resonator, the first resonator and the second waveguide, and the second waveguide and the electro-optic modulator are all from 10 to 1000 nm.

5. The resonator system of claim 1, wherein the radius of the resonator is from 1 to 1000 um.

6. The resonator system of claim 1, wherein the radius of the electro-optic modulator is from 1 to 1000 um.

7. A resonator system comprising a light source generating device for outputting a broadband light source and a resonating cavity device;
    wherein the resonating cavity device includes:
    a first waveguide with an input end for receiving the light source;
    a first resonator disposed adjacent to the first waveguide for receiving the light source coupled from the first waveguide in order to generate a first resonating light source;
    a second resonator disposed adjacent to the first resonator for receiving the first resonating light source coupled from the first resonator in order to generate a second resonating light source;
    a second waveguide having one side disposed adjacent to the second resonator, an adapting end for receiving the second resonating light source coupled from the second resonator, and an output end; and
    an electro-optic modulator disposed adjacent to the other side of the second waveguide for receiving the second resonating light source coupled from the second waveguide and generating an optical modulating signal by an electro-modulating signal, and the optical modulating signal is outputted from the output end of the second waveguide,
    wherein the shape of the resonators are ring-shaped or racetrack shaped, and the shape of the electro-optic modulator is ring-shaped or racetrack shaped.

8. The resonator system of claim 7, wherein the electro-optic modulator further comprises a modulating control unit for tuning the second resonating light source.

9. The resonator system of claim 8, wherein the modulating control unit receives a electric signal for tuning the second resonating light source.

10. The resonator system of claim 7, wherein the distances between the first waveguide and the first resonator, the first resonator and the second resonator, the second resonator and the second waveguide, and the second waveguide and the electro-optic modulator are all from 10 to 1000 nm.

11. The resonator system of claim 7, wherein both radius of the resonator is from 1 to 1000 um.

12. The resonator system of claim 7, wherein the radius of the electro-optic modulator is from 1 to 1000 um.

13. The resonator system of claim 7, further comprising a third waveguide disposed between the first resonator and the second resonator.

14. The resonator system of claim 7, further comprising N sets of a waveguide and a resonator disposed in sequence between the second resonator and the second waveguide; wherein N is an integer larger than 1.

15. A resonator system comprising a light source generating device for outputting a broadband light source and a resonating cavity device;
    wherein the resonating cavity device includes:
    a first waveguide with an input end for receiving the light source;
    a first resonator disposed adjacent to the first waveguide for receiving the light source coupled from the first waveguide and generating a resonating light source;
    a second waveguide having one side disposed adjacent to the first resonator and an adapting end for receiving the resonating light source coupled from the first resonator;
    an electro-optic modulator disposed adjacent to the other side of the second waveguide for receiving the resonating light source coupled from the second waveguide and generating an optical modulating signal by an electro-modulating signal; and
    a third waveguide having one end disposed adjacent to the optic-electro modulator, an adapting end for receiving the optical modulating signal coupled from the optic-electro modulator, and an output end for outputting the optical modulating signal,
    wherein the shape of the resonator is ring-shaped or racetrack shaped, and the shape of the electro-optic modulator is ring-shaped or racetrack shaped.

16. The resonator system of claim 15, wherein the electro-optic modulator further comprises a modulating control unit for tuning the resonating light source in the second waveguide.

17. The resonator system of claim 16, wherein the modulating control unit receives a electric signal for tuning the resonating light source in the second waveguide.

18. The resonator system of claim 15, wherein the distances between the first waveguide and the first resonator, the first resonator and the second waveguide, the second waveguide and the optic-electro modulator, and the electro-optic modulator and the third waveguide are all from 10 to 1000 nm.

19. The resonator system of claim 15, wherein the radius of the resonator is from 1 to 1000 um.

20. The resonator system of claim 15, wherein the radius of the electro-optic modulator is from 1 to 1000 um.

21. The resonator system of claim 15, further comprising a fourth waveguide and a second resonator disposed in sequence between the first resonator and the second waveguide.

22. The resonator system of claim 15, further comprising N sets of a waveguide and a resonator disposed in sequence between the first resonator and the second waveguide; wherein N is an integer larger than 1.

* * * * *